United States Patent
Chung

(10) Patent No.: US 9,456,058 B1
(45) Date of Patent: Sep. 27, 2016

(54) SMART ASSET MANAGEMENT FOR A CONTENT ITEM

(71) Applicant: Google Inc., Mountain View, CA (US)

(72) Inventor: Wook Jin Chung, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/843,730

(22) Filed: Sep. 2, 2015

Related U.S. Application Data

(63) Continuation of application No. 13/902,095, filed on May 24, 2013, now Pat. No. 9,143,555.

(51) Int. Cl.
  *G06F 15/16* (2006.01)
  *H04L 29/06* (2006.01)
  *H04L 29/08* (2006.01)
  *G06F 17/30* (2006.01)

(52) U.S. Cl.
  CPC ........... *H04L 67/42* (2013.01); *G06F 17/3089* (2013.01); *H04L 67/10* (2013.01); *H04L 67/22* (2013.01)

(58) Field of Classification Search
  CPC ... H04L 67/42; H04L 67/10; H04L 67/1036; H04L 67/22; G06F 17/3089
  See application file for complete search history.

(56) References Cited

U.S. PATENT DOCUMENTS

| | | | |
|---|---|---|---|
| 8,046,672 B2 | 10/2011 | Hegde et al. | |
| 8,200,205 B2 | 6/2012 | Ramer et al. | |
| 8,346,784 B1 * | 1/2013 | Potekhin | G06F 17/30861 707/602 |
| 8,533,605 B1 * | 9/2013 | Cha | H04M 1/72566 715/744 |
| 8,972,860 B2 * | 3/2015 | Corbett | G06F 17/30 715/200 |
| 2005/0091111 A1 | 4/2005 | Green et al. | |
| 2010/0299607 A1 * | 11/2010 | Tian | G06F 9/542 715/738 |
| 2011/0022519 A1 | 1/2011 | Pan | |
| 2011/0231265 A1 | 9/2011 | Brown et al. | |
| 2013/0159936 A1 | 6/2013 | Yamaguchi et al. | |
| 2014/0304576 A1 * | 10/2014 | Walton | G06F 17/30029 715/201 |
| 2014/0344351 A1 * | 11/2014 | Broz | H04L 67/10 709/204 |

OTHER PUBLICATIONS

Notice of Allowance on U.S. Appl. No. 13/902,095 dated May 22, 2015.

* cited by examiner

*Primary Examiner* — Krisna Lim
(74) *Attorney, Agent, or Firm* — Foley & Lardner LLP; John D. Lanza

(57) ABSTRACT

A method for managing assets for a content item to be displayed on at least one client computing device having a display is provided. Additionally, a server computing device for managing assets for a content item to be displayed on at least one client computing device having a display is provided. Additionally, a computer-readable storage device having processor-executable instructions embodied thereon is provided. The processor-executable instructions are for managing assets for a content item to be displayed on at least one client computing device having a display.

20 Claims, 11 Drawing Sheets

SMART ASSET MANAGEMENT FOR A CONTENT ITEM

CROSS REFERENCES TO RELATED APPLICATIONS

This application is a continuation of U.S. application Ser. No. 13/902,095, titled "Smart Asset Management for a Content Item," filed May 24, 2013, now issued as U.S. Pat. No. 9,143,555, which is hereby incorporated by reference in its entirety.

BACKGROUND

This description relates to presenting a content item on client computing devices, and more particularly, to controlling a loading priority, a placement, and a selection of assets for display in a content item on client computing devices.

A content item may be displayed on a client computing device, such as alongside text in a webpage or other publication, to present information that may be pertinent to the publication or that may otherwise be of interest to a user viewing the publication. The content item may include multiple assets, such as images, audio, video, and text. The content item may include a set of instructions that are executable by a client computing device to control requesting and loading of assets in a manner that a designer of the content item expects will most interest a viewer of the content item. Such instructions are generated when the content item is initially designed and do not take into account real-world information about how viewers are interacting with the content item.

BRIEF DESCRIPTION OF DISCLOSURE

In one aspect, a method for managing assets for a content item to be displayed on at least one client computing device having a display is provided. The method implemented by a server computing device that is communicatively coupled to the at least one client computing device. The method includes generating a content item that includes a plurality of assets and instructions for controlling at least one of a loading priority of each of the assets, a placement of each of the assets in the content item, and a selection of a subset of the assets for display with the content item. The method additionally includes transmitting the content item to the at least one client computing device, receiving an indication from the at least one client computing device of an interaction with the content item, and modifying the instructions to change at least one of the loading priority of each of the assets, the placement of each of the assets in the content item, and the selection of the subset of the assets for display with the content item, based at least in part on the indication.

In another aspect, a server computing device for managing assets for a content item to be displayed on at least one client computing device having a display is provided. The server computing device is communicatively coupled to the at least one client computing device and is configured to generate a content item comprising a plurality of assets and instructions for controlling at least one of a loading priority of each of the assets, a placement of each of the assets in the content item, and a selection of a subset of the assets for display with the content item. The server computing device is additionally configured to transmit the content item to the at least one client computing device, receive an indication from the at least one client computing device of an interaction with the content item, and modify the instructions to change at least one of the loading priority of each of the assets, the placement of each of the assets in the content item, and the selection of the subset of the assets for display with the content item, based at least in part on the indication.

In another aspect, a computer-readable storage device having processor-executable instructions embodied thereon is provided. The instructions are for managing assets for a content item to be displayed on at least one client computing device having a display. When executed by a server computing device communicatively coupled to the at least one client computing device, the processor-executable instructions cause the server computing device to perform the steps of generating a content item comprising a plurality of assets and instructions for controlling at least one of a loading priority of each of the assets, a placement of each of the assets in the content item, and a selection of a subset of the assets for display with the content item, transmitting the content item to the at least one client computing device, receiving an indication from the at least one client computing device of an interaction with the content item, and modifying the instructions to change at least one of the loading priority of each of the assets, the placement of each of the assets in the content item, and the selection of the subset of the assets for display with the content item, based at least in part on the indication.

In another aspect, a server computing device for managing assets for a content item to be displayed on at least one client computing device having a display is provided. The server computing device is communicatively coupled to the at least one client computing device. The server computing device includes means for generating a content item comprising a plurality of assets and instructions for controlling at least one of a loading priority of each of the assets, a placement of each of the assets in the content item, and a selection of a subset of the assets for display with the content item. The server computing device additionally includes means for transmitting the content item to the at least one client computing device. The server computing device additionally includes means for receiving an indication from the at least one client computing device of an interaction with the content item. The server computing device additionally includes means for modifying the instructions to change at least one of the loading priority of each of the assets, the placement of each of the assets in the content item, and the selection of the subset of the assets for display with the content item, based at least in part on the indication.

In another aspect, a server computing device as described above is provided, wherein the means for receiving an indication further includes means for receiving an indication of an initial interaction with a first asset of the plurality of assets.

In another aspect, a server computing device as described above is provided, wherein the means for receiving an indication further includes means for receiving an indication from each of a plurality of client computing devices and determining a most popular asset based on which asset was most often interacted with first by the plurality of users.

In another aspect, a server computing device as described above is provided, wherein the means for receiving an indication further comprises means for receiving an indication from each of a plurality of client computing devices and determining a least popular asset based on which asset was least often interacted with first by the plurality of users.

In another aspect, a server computing device as described above is provided, wherein the means for receiving an indication further comprises means for receiving an indication from each of a plurality of client computing devices, normalizing the received indications based on at least one of a geographic location of each client computing device and a popularity of each location in which each asset was located in the transmitted content item, and determining a most popular asset based on the normalized received indications.

In another aspect, a server computing device as described above is provided, wherein the means for transmitting the content item further comprises means for transmitting the content item to the at least one client device to be displayed in conjunction with a publisher site and the means for modifying the instructions further comprises means for modifying the instructions based at least in part on a subject matter of the publisher site.

In another aspect, a server computing device as described above is provided, wherein one asset of the content item is a video and other assets of the content item are thumbnails of the video, and wherein the means for modifying the instructions further comprises means for modifying a selection of thumbnails to be presented in conjunction with the video.

In another aspect, a server computing device as described above is provided, wherein one asset of the content item is a video and the means for receiving an indication further comprises means for receiving an indication of a position within the video that playback of the video was stopped on the at least one client computing device.

In another aspect, a server computing device as described above is provided, wherein the content item is included in a content item campaign comprising a plurality of other content items, and the means for modifying the instructions further comprises means for modifying the instructions for the other content items in the content item campaign, based at least in part on the indication.

In another aspect, a server computing device as described above is provided, wherein the means for modifying the instructions further comprises means for modifying the instructions to increase an amount of click-throughs for the content item.

In another aspect, a server computing device as described above is provided, wherein the means for modifying the instructions further comprises means for modifying the instructions to increase an overall exposure to the content item on each computing device.

The features, functions, and advantages described herein may be achieved independently in various embodiments of the present disclosure or may be combined in yet other embodiments, further details of which may be seen with reference to the following description and drawings.

Figure 1:
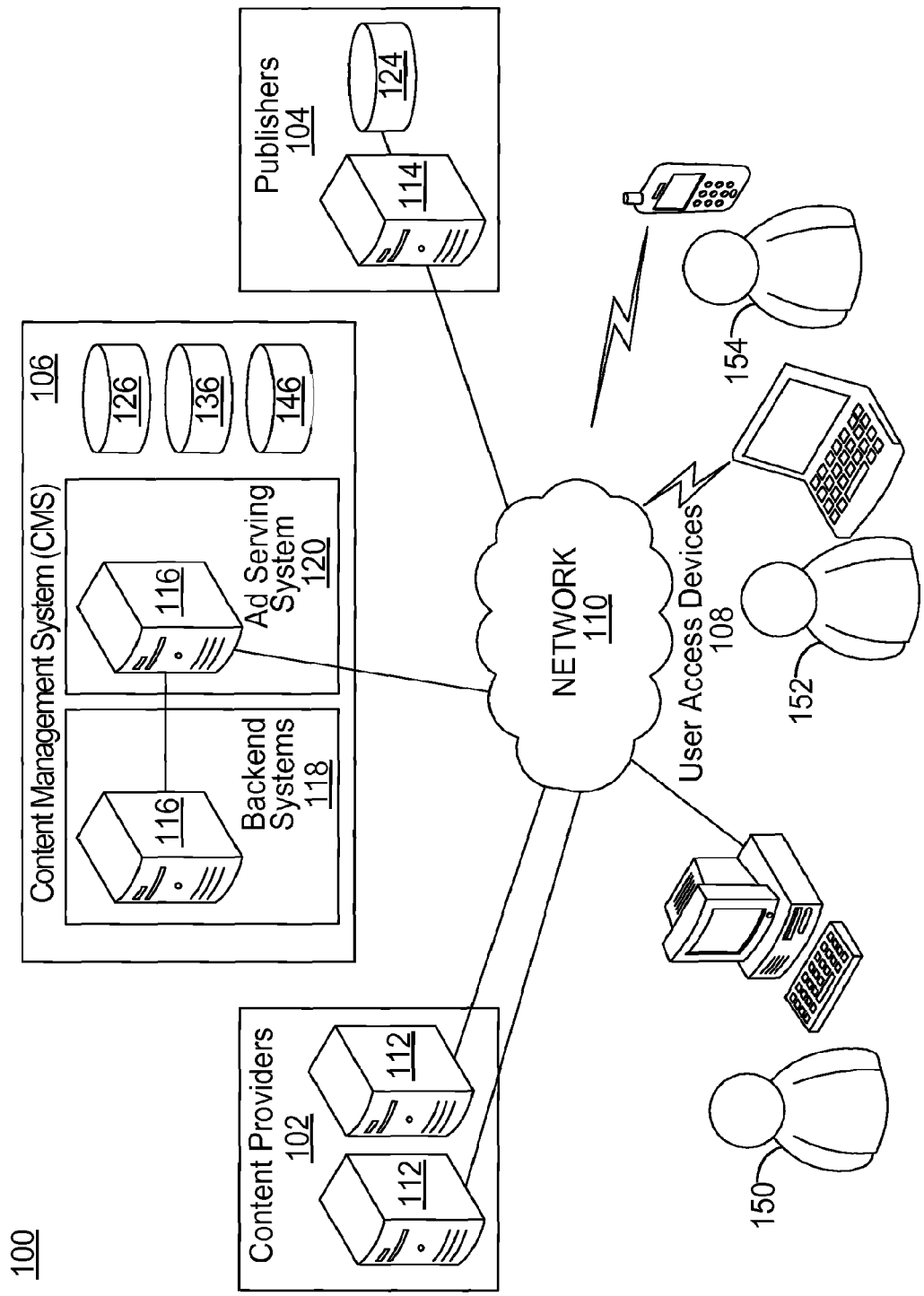
FIG. 1 is a diagram depicting an example networked environment.

Although specific features of various embodiments may be shown in some drawings and not in others, this is for convenience only. Any feature of any drawing may be referenced and/or claimed in combination with any feature of any other drawing.

DETAILED DESCRIPTION OF DISCLOSURE

The following detailed description of implementations refers to the accompanying drawings. The same reference numbers in different drawings may identify the same or similar elements. Also, the following detailed description does not limit the claims.

This subject matter described herein relates to presenting a content item on client computing devices, and more particularly, to controlling a loading priority, a placement, and a selection of assets for display in a content item on client computing devices. Content items are, for example, advertisements associated with goods or services. A content item includes a set of instructions and assets, which may be, for example, images, audio, video, and/or text. The instructions are executed by a computing device, for a example a client computing device on which the content item is displayed. The instructions control a priority in which the assets are loaded (i.e., requested and received from a server computing device), placement of the assets within the content item, and/or which assets are actually presented by the client computing device. The instructions may be subsequently modified in future versions of the content item, based on collected information pertaining to interactions with the content item.

More specifically, methods and systems herein facilitate generating a content item that includes a plurality of assets and instructions for controlling at least one of a loading priority of each of the assets, a placement of each of the assets in the content item, and a selection of a subset of the assets for display with the content item, transmitting the content item to at least one client computing device, receiving an indication from the at least one client computing device of an interaction with the content item, and modifying the instructions to change at least one of the loading priority of each of the assets, the placement of each of the assets in the content item, and the selection of the subset of the assets for display with the content item, based at least in part on the indication.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as a city, a ZIP code, or state level), so that a particular location of a user cannot be determined. Thus, the user may have control over how information is collected about the user and used by a content server.

As used herein, an element or step recited in the singular and proceeded with the word "a" or "an" should be understood as not excluding plural elements or steps, unless such exclusion is explicitly recited. Furthermore, references to "one embodiment" of the subject matter disclosed herein are not intended to be interpreted as excluding the existence of additional embodiments that also incorporate the recited features.

The methods and systems described herein may be implemented using computer programming or engineering techniques including computer software, firmware, hardware or any combination or subset thereof, wherein the technical effects may include at least one of: (a) generating a content item comprising a plurality of assets and instructions for controlling at least one of a loading priority of each of the assets, a placement of each of the assets in the content item, and a selection of a subset of the assets for display with the content item; (b) transmitting the content item to at least one client computing device; (c) receiving an indication from the at least one client computing device of an interaction with the content item; and (d) modifying the instructions to change at least one of the loading priority of each of the assets, the placement of each of the assets in the content item, and the selection of the subset of the assets for display with the content item, based at least in part on the indication.

FIG. 1 is a diagram depicting an example networked environment. With reference to FIG. 1, an example networked environment 100 may include one or more content providers 102, one or more publishers 104, a content management system (CMS) 106, and one or more user access devices 108 ("client computing devices"), which may be coupled to a network 110. User access devices are used by users 150, 152, and 154. Each of the elements 102, 104, 106, 108 and 110 in FIG. 1 may be implemented or associated with hardware components, software components, or firmware components or any combination of such components. The elements 102, 104, 106, 108 and 110 can, for example, be implemented or associated with general purpose servers, software processes and engines, and/or various embedded systems. The elements 102, 104, 106 and 110 may serve, for example, as a content distribution network. In the example embodiment, content providers 102 include advertisers, and CMS 106 is an advertising management system.

The content providers 102 may include any entities that are associated with content (i.e., a content item or multiple content items). In some embodiments, the content includes any form of communication in which one or more products, services, ideas, messages, people, organizations or other items are identified and promoted (or otherwise communicated). Content is not limited to advertisements and commercial promotions. Rather, content may include public service announcements or any other types of notices, such as public notices published in printed or electronic press or broadcasts.

Content may be communicated via various mediums and in various forms. In some examples, content may be communicated through an interactive medium, such as the Internet, and may include graphical content (e.g., banner content), textual content, image content, audio content, video content, content combining one of more of any of such components, or any form of electronically delivered content. Content may include embedded information, such as embedded media, links, meta-information, and/or machine executable instructions. Content could also be communicated through RSS (Really Simple Syndication) feeds, radio channels, television channels, print media, and other media.

Content can refer to both a single "creative" and a "content group." A creative refers to any entity that represents one content impression. A content impression refers to any form of presentation of content such that it is viewable/receivable by a user. In some examples, a content impression may occur when content is displayed on a display device of a user access device (i.e., a "client computing device"). A content group refers, for example, to an entity that represents a group of creatives that share a common characteristic, such as having the same content selection and recommendation criteria. Content groups can be used to create a content campaign.

The content providers 102 may provide (or be otherwise associated with) products and/or services related to content. The content providers 102 may include or be associated with, for example, retailers, wholesalers, warehouses, manufacturers, distributors, health care providers, educational establishments, financial establishments, technology providers, energy providers, utility providers, or any other product or service providers or distributors.

The content providers 102 may directly or indirectly generate, maintain, and/or analyze content, which may be related to products or services offered by or otherwise associated with the content providers 102. The content providers 102 may include or maintain one or more data processing systems 112, such as servers or embedded systems, coupled to the network 110. The content providers 102 may include or maintain one or more processes that run on one or more data processing systems.

The publishers 104 may include any entities that generate, maintain, provide, present and/or otherwise process publications in the environment 100. "Publishers," in particular, include authors of publications, wherein authors may be individual persons, or, in the case of works made for hire, the proprietor(s) who hired the individual(s) responsible for creating the online publications. The term "publication" refers to various types of web-based, software application-based and/or otherwise presented information, including articles, discussion threads, reports, analyses, financial statements, music, video, graphics, search results, web page listings, information feeds (e.g., RSS feeds), television broadcasts, radio broadcasts, printed information, or any other form of information that may be presented to a user using a computing device such as one of user access devices 108.

In some implementations, the publishers 104 may include publishers with an Internet presence, such as online publication and news providers (e.g., online newspapers, online magazines, television websites, etc.), online service providers (e.g., financial service providers, health service providers, etc.), and the like. The publishers 104 can include software application providers, television broadcasters, radio broadcasters, satellite broadcasters, and other providers of publications. One or more of the publishers 104 may represent a publication network that is associated with the CMS 106.

The publishers 104 may receive requests from the user access devices 108 (or other elements in the environment 100) and provide or present publications to the requesting devices. The publishers may provide or present publications via various mediums and in various forms, including web based and non-web based mediums and forms. The publishers 104 may generate and/or maintain such publications and/or retrieve the publications from other network resources.

In addition to publications, the publishers 104 may be configured to integrate or combine retrieved publications with content that is related or relevant to the retrieved publication for display to users 150, 152, and 154. The relevant content may be provided from the CMS 106 and may be combined with a publication for display to users 150, 152, and 154. In some examples, the publishers 104 may retrieve a publication for display on a particular user access device 108 and then forward the publication to the user access device 108 along with code that causes content from the CMS 106 to be displayed to the user 150, 152, or 154. In other examples, the publishers 104 may retrieve a publication, retrieve relevant content (e.g., from the CMS 106 or the content providers 102), and then integrate the content and the publication to form a page for display to the user 150, 152, or 154.

As noted above, one or more of the publishers 104 may represent a publication network. In such an implementation, the content providers 102 may be able to present content to users through this publication network.

The publishers 104 may include or maintain one or more data processing systems 114, such as servers or embedded systems, coupled to the network 110. They may include or maintain one or more processes that run on data processing systems. In some examples, the publishers 104 may include one or more publication repositories 124 for storing publications and other information.

The CMS 106 manages content and provides various services to the content providers 102, the publishers 104, and the user access devices 108. The CMS 106 may store content in a content repository 126 and facilitate the distribution or selective provision and recommendation of content through the environment 100 to the user access devices 108.

The CMS 106 may include one or more data processing systems 116, such as servers or embedded systems, coupled to the network 110. It can also include one or more processes, such as server processes. In some examples, the CMS 106 may include a content serving system 120 and one or more backend processing systems 118. The content serving system 120 may include one or more data processing systems 116 and may perform functionality associated with delivering content to publishers or user access devices 108. The backend processing systems 118 may include one or more data processing systems 116 and may perform functionality associated with identifying relevant content to deliver, processing various rules, performing filtering processes, generating reports, maintaining accounts and usage information, and other backend system processing. The CMS 106 can use the backend processing systems 118 and the content serving system 120 to selectively recommend and provide relevant content from the content providers 102 through the publishers 104 to the user access devices 108.

The CMS 106 may include or access one or more crawling, indexing and searching modules (not shown). These modules may browse accessible resources (e.g., the World Wide Web, publisher content, data feeds, etc.) to identify, index and store information. The modules may browse information and create copies of the browsed information for subsequent processing. The modules may also check links, validate code, harvest information, and/or perform other maintenance or other tasks.

Searching modules may search information from various resources, such as the World Wide Web, publications, intranets, newsgroups, databases, and/or directories. The search modules may employ one or more known search or other processes to search data. In some implementations, the search modules may index crawled content and/or content received from data feeds to build one or more search indices. The search indices may be used to facilitate rapid retrieval of information relevant to a search query.

The CMS 106 may include one or more interface or frontend modules for providing the various features to content providers, publishers, and user access devices. For example, the CMS 106 may provide one or more publisher front-end interfaces (PFEs) for allowing publishers to interact with the CMS 106. The CMS 106 may also provide one or more content provider front-end interfaces (CPFEs) for allowing content providers to interact with the CMS 106. In some examples, the front-end interfaces may be configured as web applications that provide users with network access to features available in the CMS 106.

The CMS 106 provides various content management features to the content providers 102. The CMS 106 features may allow users to set up user accounts, set account preferences, create content, select keywords for content, create campaigns or initiatives for multiple products or businesses, view reports associated with accounts, analyze costs and return on investment, selectively identify customers in different regions, selectively recommend and provide content to particular publishers, analyze financial information, analyze content performance, estimate content traffic, access keyword tools, add graphics and animations to content, etc.

The CMS 106 may allow the content providers 102 to create content and input keywords for which the content will appear. In some examples, the CMS 106 may provide content to user access devices or publishers when keywords associated with that content are included in a user request or a requested publication. The CMS 106 may also allow the content providers 102 to set bids for content. A bid may represent the maximum amount a content provider is willing to pay for each content impression, user click-through of content or other interaction with content. A click-through can include any action a user takes to select content. The content providers 102 may also choose a currency and monthly budget.

The CMS 106 may also allow the content providers 102 to view information about content impressions, which may be maintained by the CMS 106. The CMS 106 may be configured to determine and maintain the number of content impressions relative to a particular website or keyword. The CMS 106 may also determine and maintain the number of click-throughs for content as well as the ratio of click-throughs to impressions.

The CMS 106 may also allow the content providers 102 to select and/or create conversion types for content. A "conversion" may occur when a user consummates a transaction related to given content. A conversion could be defined to occur when a user clicks on content, for example a specific content item, is referred to the content provider's web page, and consummates a purchase there before leaving that web page. In another example, a conversion could be defined as the display of content to a user and a corresponding purchase on the content provider's web page within a predetermined time (e.g., seven days). The CMS 106 may store conversion data and other information in a conversion data repository 136.

The CMS 106 may allow the content providers 102 to input description information associated with content. This information could be used to assist the publishers 104 in determining content to publish. The content providers 102 may additionally input a cost/value associated with selected conversion types, such as a five dollar credit to the publishers 104 for each product or service purchased.

The CMS 106 may provide various features to the publishers 104. The CMS 106 may deliver content (associated with the content providers 102) to the user access devices 108 when users access publications from the publishers 104. The CMS 106 can be configured to deliver content that is relevant to publisher sites, publications, and publisher audiences.

In some examples, the CMS 106 may crawl publications provided by the publishers 104 and deliver content that is relevant to publisher sites, publications and publisher audiences based on the crawled publications. The CMS 106 may also selectively recommend and/or provide content based on user information and behavior, such as particular search queries performed on a search engine website. The CMS 106 may store such information in a general database 146. In some examples, the CMS 106 can add search to a publisher site and deliver content configured to provide appropriate and relevant content relative to search results generated by requests from visitors of the publisher site. A combination of these and other approaches can be used to deliver relevant content.

The CMS 106 may allow the publishers 104 to search and select specific products and services as well as associated content to be displayed with publications provided by the publishers 104. For example, the publishers 104 may search through content in the content repository 126 and select certain content for display with their publications.

The CMS 106 may be configured to selectively recommend and provide content created by the content providers 102 to the user access devices 108 directly or through the publishers 104. The CMS 106 may selectively recommend and provide content to a particular publisher 104 (as described in further detail herein) or a requesting user access device 108 when a user requests search results or loads a publication from the publisher 104.

In some implementations, the CMS 106 may manage and process financial transactions among and between elements in the environment 100. For example, the CMS 106 may credit accounts associated with the publishers 104 and debit accounts of the content providers 102. These and other transactions may be based on conversion data, impressions information and/or click-through rates received and maintained by the CMS 106.

"Computing devices", for example user access devices 108, may include any devices capable of receiving information from the network 110. The user access devices 108 could include general computing components and/or embedded systems optimized with specific components for performing specific tasks. Examples of user access devices include personal computers (e.g., desktop computers), mobile computing devices, cell phones, smart phones, head-mounted computing devices, media players/recorders, music players, game consoles, media centers, media players, electronic tablets, personal digital assistants (PDAs), television systems, audio systems, radio systems, removable storage devices, navigation systems, set top boxes, other electronic devices and the like. The user access devices 108 can also include various other elements, such as processes running on various machines.

The network 110 may include any element or system that facilitates communications among and between various network nodes, such as elements 108, 112, 114 and 116. The network 110 may include one or more telecommunications networks, such as computer networks, telephone or other communications networks, the Internet, etc. The network 110 may include a shared, public, or private data network encompassing a wide area (e.g., WAN) or local area (e.g., LAN). In some implementations, the network 110 may facilitate data exchange by way of packet switching using the Internet Protocol (IP). The network 110 may facilitate wired and/or wireless connectivity and communication.

For purposes of explanation only, certain aspects of this disclosure are described with reference to the discrete elements illustrated in FIG. 1. The number, identity and arrangement of elements in the environment 100 are not limited to what is shown. For example, the environment 100 can include any number of geographically-dispersed content providers 102, publishers 104 and/or user access devices 108, which may be discrete, integrated modules or distributed systems. Similarly, the environment 100 is not limited to a single CMS 106 and may include any number of integrated or distributed CMS systems or elements.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes running on separate machines or a single process running on a single machine.

Figure 2:
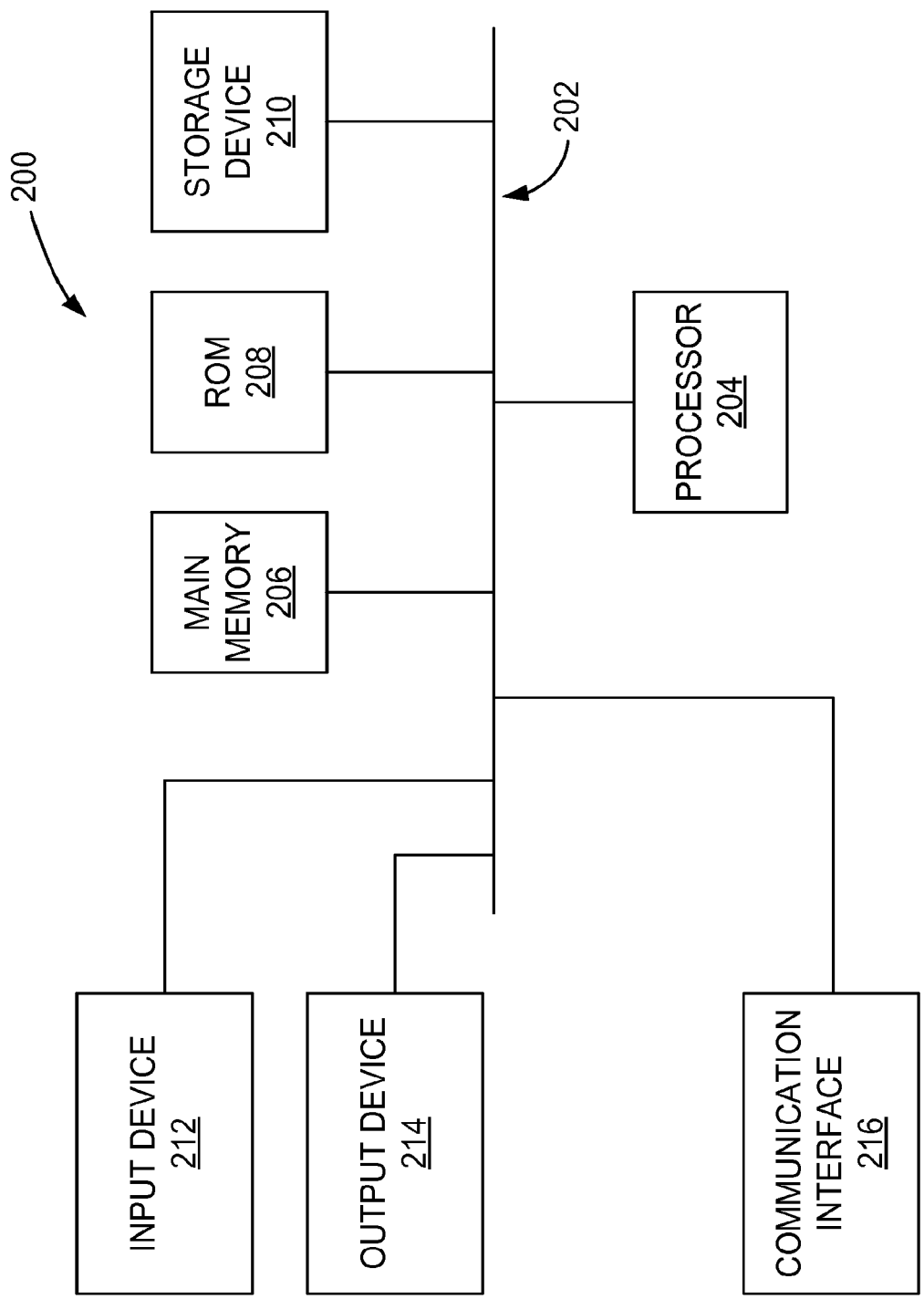
FIG. 2 is a diagram of an example computing device.

FIG. 2 is a block diagram of a computing device 200, for example, a client computing device such as user access device 108, or a server computing device, for example one or more data processing systems 116 of backend systems 118 and content serving system 120 of CMS 106. Computing device 200 may include a bus 202, a processor 204, a main memory 206, a read only memory (ROM) 208, a storage device 210, an input device 212, an output device 214, and a communication interface 216. Bus 202 may include a path that permits communication among the components of computing device 200.

Processor 204 may include any type of conventional processor, microprocessor, or processing logic that interprets and executes instructions. Main memory 206 may include a random access memory (RAM) or another type of dynamic storage device that stores information and instructions for execution by processor 204. ROM 208 may include a conventional ROM device or another type of static storage device that stores static information and instructions for use by processor 204. Storage device 210 may include a magnetic and/or optical recording medium and its corresponding drive.

Input device 212 may include a conventional mechanism that permits computing device 200 to receive commands, instructions, or other inputs from a user 150, 152, or 154, including visual, audio, touch, button presses, stylus taps, etc. Additionally, input device may receive location information. Accordingly, input device 212 may include, for example, a camera, a microphone, one or more buttons, a touch screen, and/or a GPS receiver. Output device 214 may include a conventional mechanism that outputs information to the user, including a display (including a touch screen) and/or a speaker. Communication interface 216 may include any transceiver-like mechanism that enables computing device 200 to communicate with other devices and/or systems. For example, communication interface 216 may include mechanisms for communicating with another device or system via a network, such as network 110 (FIG. 1).

As described herein, computing device 200 facilitates managing assets for a content item. Computing device 200 may perform this and other operations in response to processor 204 executing software instructions contained in a computer-readable medium, such as memory 206. A computer-readable medium may be defined as a physical or logical memory device and/or carrier wave. The software instructions may be read into memory 206 from another computer-readable medium, such as data storage device 210, or from another device via communication interface 216. The software instructions contained in memory 206 may cause processor 204 to perform processes described herein. In other implementations, hardwired circuitry may be used in place of or in combination with software instructions to implement processes consistent with the subject matter herein. Thus, implementations consistent with the principles of the subject matter disclosed herein are not limited to any specific combination of hardware circuitry and software.

Figure 3:
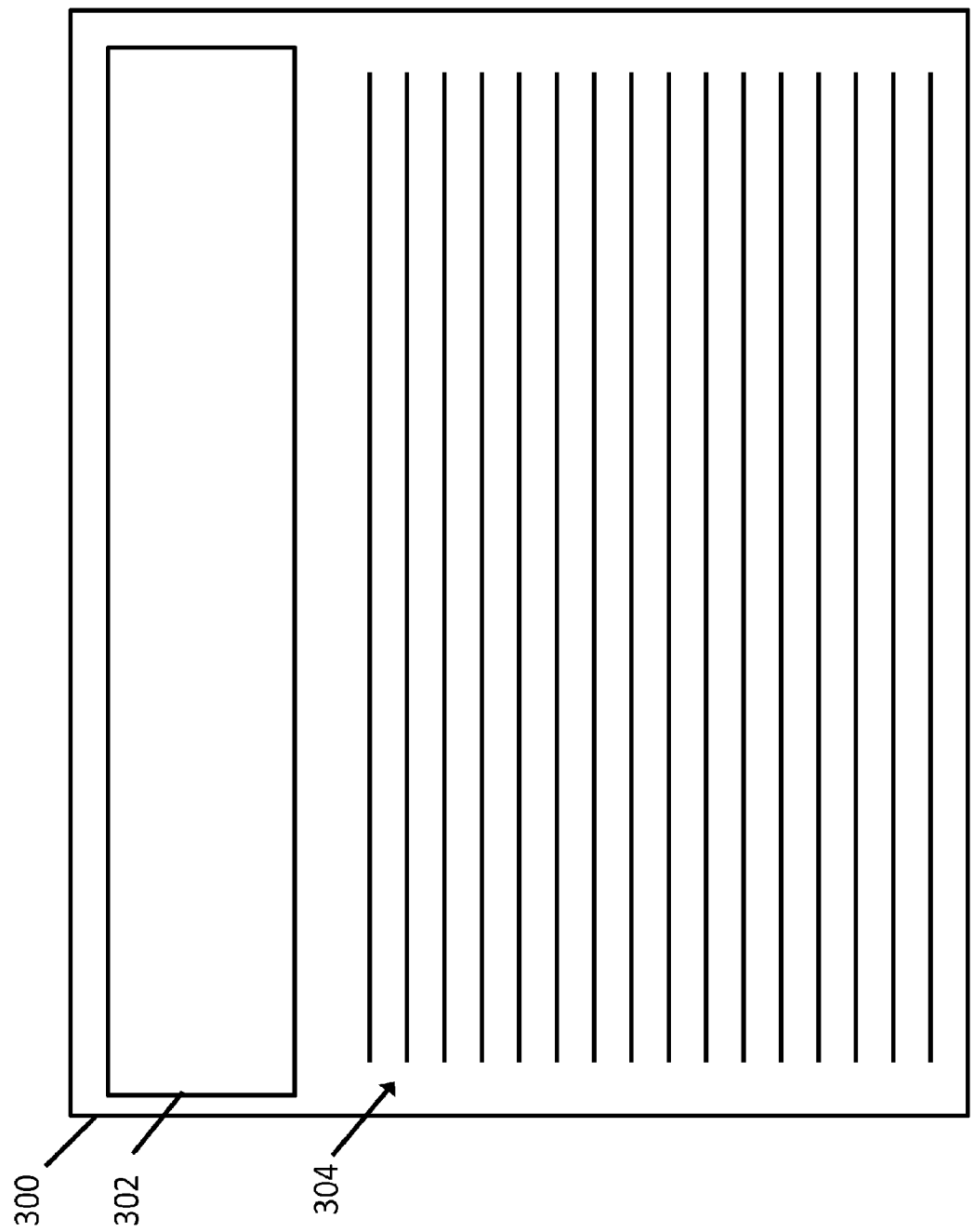
FIG. 3 is an example publication including an example content item.

FIG. 3 is an example publication 300 that may be displayed by client computing device 108. More specifically, publication 300 may be transmitted from a publisher 104 to client computing device 108 and displayed thereon. Publication 300 includes publication material 304, which may be, for example, text, images, and/or video. Displayed in conjunction with publication material 304 is a content item 302. Content item 302 may be transmitted from a server computing device, for example CMS 106, to client computing device 108 for display in conjunction with publication material 304. In publication 300, content item 302 appears above publication material 304. In other implementations, content item 302 may be located below, beside, or between portions of publication material 304. In yet other implementations, content item 302 may overlay publication material 302. In yet other implementations, content item 302 may appear alone.

As described above, content item 302 is a communication in which one or more products, services, ideas, messages, people, organizations or other items are identified and promoted (or otherwise communicated). In one embodiment, content item 302 is an ad. Implementations of content item 302 are not limited to advertisements and commercial promotions. Rather, some implementations of content item 302 may include public service announcements or any other types of notices. In some implementations, content item 302 relates to publication material 304. Content item 302 can include, for example, text, images, video, and/or audio.

Figure 4:
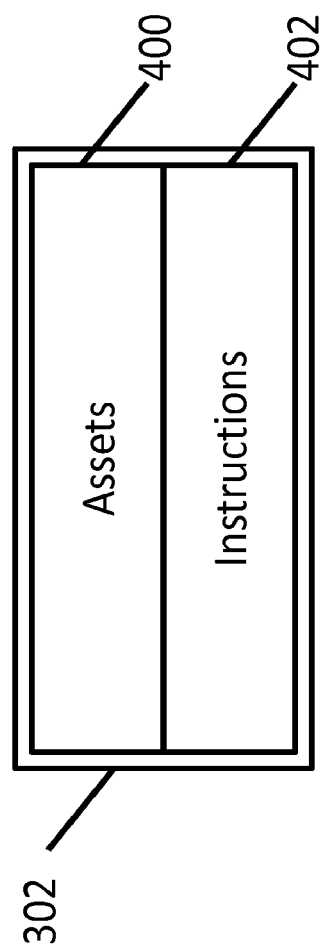
FIG. 4 is a diagram of the content item of FIG. 3.

FIG. 4 is a diagram of content item 302 of FIG. 3. Content item 302 includes assets 400 and instructions 402. More specifically, each asset 400 may be, for example, an image, text, audio, and/or video. Instructions 402 are computer-executable instructions that may be executed, for example, by client computing device 108. Instructions 402 control a loading priority for each asset 400, a placement for each asset 400 in content item 302, and/or whether a particular asset 400 is displayed or presented at all. Depending on a data size of each asset 400 and on a communication speed between client computing device 108 and a server, for example CMS 106, a total load time for all of assets 400 to be loaded onto client computing device 108 will vary. Accordingly, instructions 402 may cause a first set of assets 400 to be initially loaded (i.e., requested and received from the server) and displayed while additional assets 400 are being loaded.

The order in which the assets 400 are loaded may be initially determined by a designer of content item 302 based on predictions of, for example, what assets 400 are of most interest and of least interest to a potential viewer (i.e., a user of client computing device 108) and whether a goal associated with content item 302 is to have a user of a client computing device 108 click-through content item 302 in a minimal amount of time, by presenting assets 400 of most potential interest most prominently, or to maximize an amount of exposure to the content item 302 by presenting assets 400 of least potential interest most prominently.

Additionally, instructions 402 may cause assets of a predicted interest level to appear in a location in content item 302 based on a popularity of the location. That is, users of client computing devices 108 may have a tendency to direct their attention to a particular location in content item 302 regardless of what asset 400 is presented in that location.

Instructions 402 additionally include instructions to transmit an indication of an interaction with content item 302 back to a server, for example CMS 106, for collection and evaluation. The indication of the interaction may be, for example, an indication that a particular asset 400 presented in content item 302 was clicked on. In other embodiments, instructions 402 cause more than one indication of an interaction to be transmitted back to CMS 106. For example, rather than only reporting one click on an asset 400, every click and the order in which the clicks occurred may also be transmitted back to CMS 106. Additionally, an amount of time that content item 302 and/or one or more particular assets of content item 302 were presented before an interaction occurred may be transmitted to CMS 106. Further, the indication may include additional information about the type of interaction that occurred. For example, the indication may include information indicating that the interaction was to stop playback of a video.

As content item 302 is transmitted to client computing devices 108 and the indications of interactions are received by CMS 106 and evaluated, CMS 106 may modify instructions 402 in accordance with the above-described goals. In addition, in evaluating the reported indications of user interactions and modifying instructions 402, CMS 106 may additionally factor in a type or category that publication 300 falls into. CMS 106 may additionally factor in locations of computing devices 108 transmitting indication of interactions back to CMS 106. For example, indications of interactions transmitted from client computing devices 108 located in coastal areas may show a preference towards assets that promote beach-related products and services than do indications of interactions originating from non-coastal areas. Accordingly, CMS 106 may normalize the indications to account for differences in geographic locations or, in other implementations, may generate a first set of instructions 402 for versions of content item 302 transmitted to client computing devices 108 that are located in a first geographic area or type of geographic area (e.g., coastal areas), and may generate a second set of instructions 402 for versions of content item 302 transmitted to client computing devices 108 that are located in a second geographic area or type of geographic area (e.g., non-coastal areas).

Additionally, CMS 106 may compare indications of interactions pertaining to other content items that are included in a campaign with content item 302. Further, CMS 106 may take into account a form factor of each client computer device 108 (e.g., desktop computer, laptop, tablet, or smart phone) transmitting an indication of an interaction and adjust instructions 402 differently for each form factor of client computing device 108 that may receive content item 302 in the future. Additionally, CMS 106 may take into account a popularity of a particular location within content item 302 that a particular asset 400 appeared in, and normalize the received interaction indications to determine a popularity of each asset 400 irrespective of its location within content item 302. CMS 106 may continually receive and evaluate indications of interactions while CMS 106 modifies instructions 402 and transmits updated versions of content item 302 to additional client computing devices 108.

Figure 5:
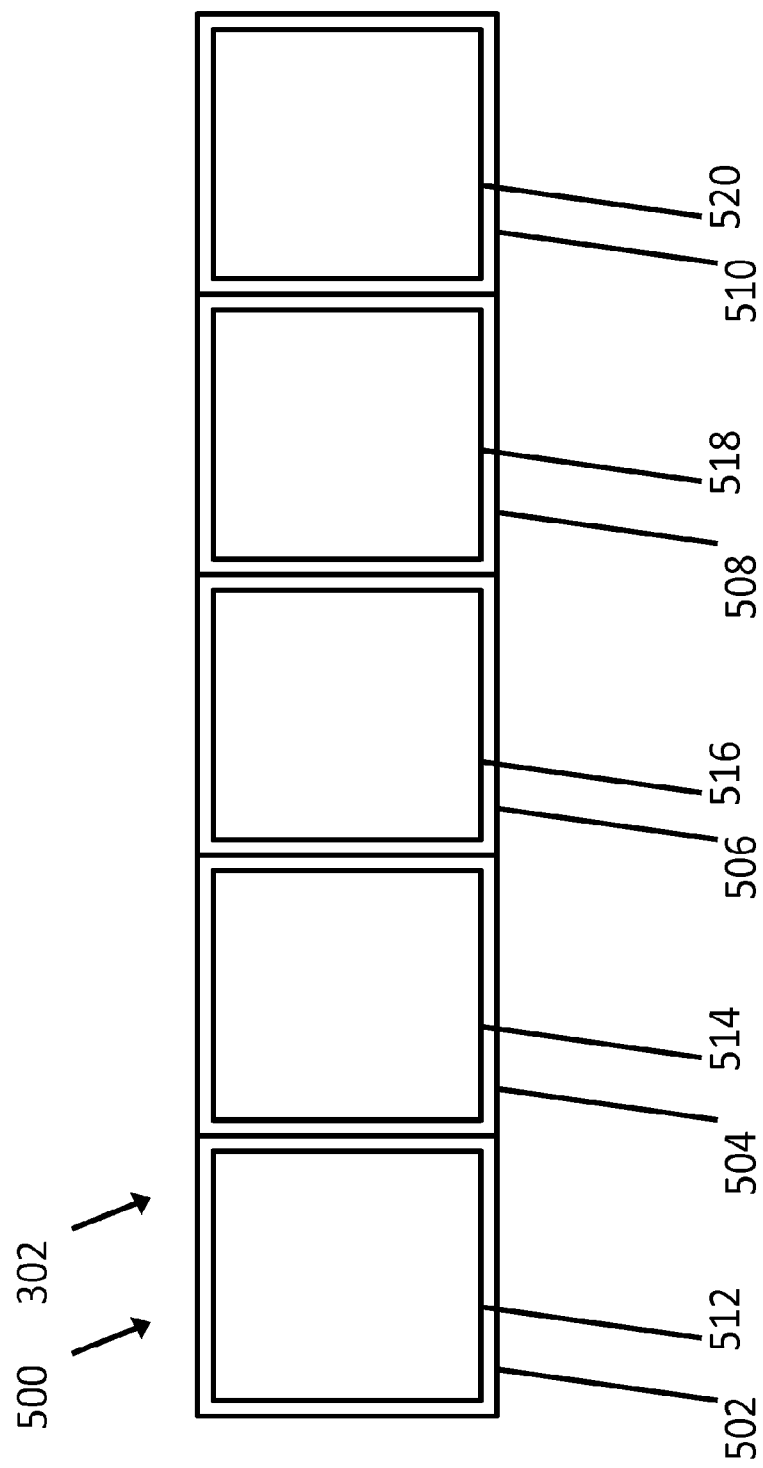
FIG. 5 is a diagram of an example content item.

FIG. 5 is a diagram of an example content item 500. Content item 500 is an implementation of content item 302, described above. Content item 500 includes a first slot 502, a second slot 504, a third slot 506, a fourth slot 508, and a fifth slot 510. Instructions 402 cause a first asset 512 to be loaded and displayed in first slot 502, a second asset 514 to be loaded and displayed in second slot 504, a third asset 516 to be loaded and displayed in third slot 506, a fourth asset 518 to be loaded and displayed in fourth slot 508, and a fifth asset 520 to be loaded and displayed in fifth slot 510. Each slot 502, 504, 506, 508, and 510 is a position or location in content item 500. When content item 500 is transmitted to a first set of client computing devices 108, the first set of client computing devices 108 may transmit back to CMS 106 indications of interactions that demonstrate that first asset 512 is clicked on more often than any other assets 514, 516, 518, and 520. CMS 106 may modify instructions 402 such that first asset 512, second asset 514, third asset 516, fourth asset 518, and fifth asset 520 are loaded and displayed in different slots. CMS 106 may then transmit the modified instructions 402 in an updated version of content item 500 to additional client computing devices 108 and receive additional indications of interactions with content item 500. From the additional indications, CMS 106 may determine a popularity of each slot 502, 504, 506, 508, and 510 irrespective of the asset 512, 514, 516, 518, and 520 displayed in the slot, and likewise determine a popularity or interest level associate with each asset 512, 514, 516, 518, and 520 irrespective of the slot that the asset is displayed in. CMS 106 may perform further evaluations of indications of interactions, and may further modify instructions 402, as described with reference to FIG. 4.

Figure 6:
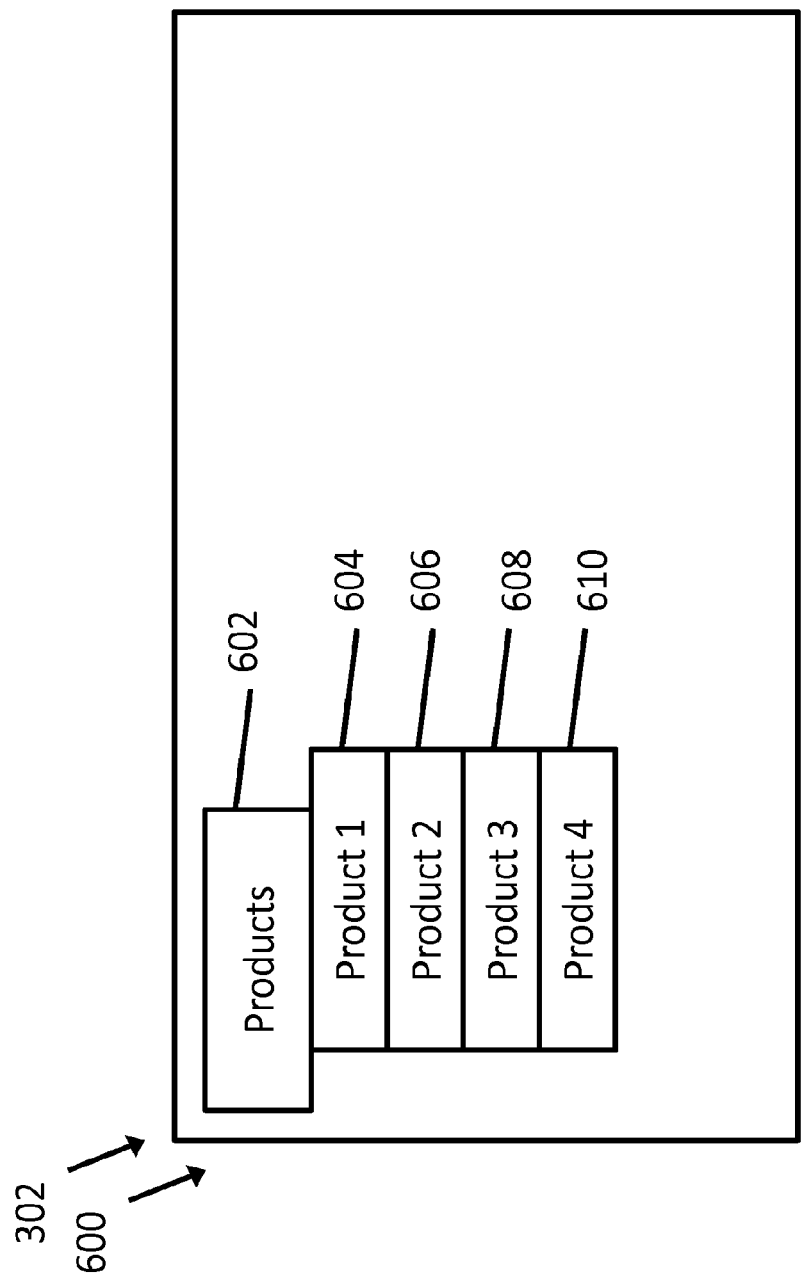
FIG. 6 is a diagram of another example content item.

FIG. 6 is a diagram of another example content item 600. Content item 600 is an implementation of content item 302, described above. Content item 600 includes a menu 602 in which a user of client computing device 108 may select a particular menu item 604, 606, 608, and 610 to receive additional information about a subject matter of the menu item 604, 606, 608, or 610. In content item 600, menu 602 is a product menu, and each of menu items 604, 606, 608, and 610 corresponds to a specific product for which more information can be displayed. Each menu item 602, 606, 608, and 610 is associated with one or more assets, for example, a video that describes the specific product associated with the menu item. Instructions 402 (shown in FIG. 4) may cause assets 400 (shown in FIG. 4) associated with menu item 604 to be loaded before assets 400 associated with menu items 606, 608, and 610. However, CMS 106 may receive indications of interactions from client computing devices 108 that show that menu item 606 is clicked on more often than menu item 604. Accordingly, CMS 106 may modify instructions 402 in an updated version of content item 600 to cause assets 400 associated with menu item 606 to be loaded by client computing devices 108 before assets 400 associated with any other menu items 604, 608, and 610 are loaded. As a result, assets 400 that have the highest level of interest to users of client computing devices 108 are available for presentation in content item 302 before assets 400 of less interest, and a likelihood and frequency of click-throughs associated with content item 600 may be increased.

Figure 7:
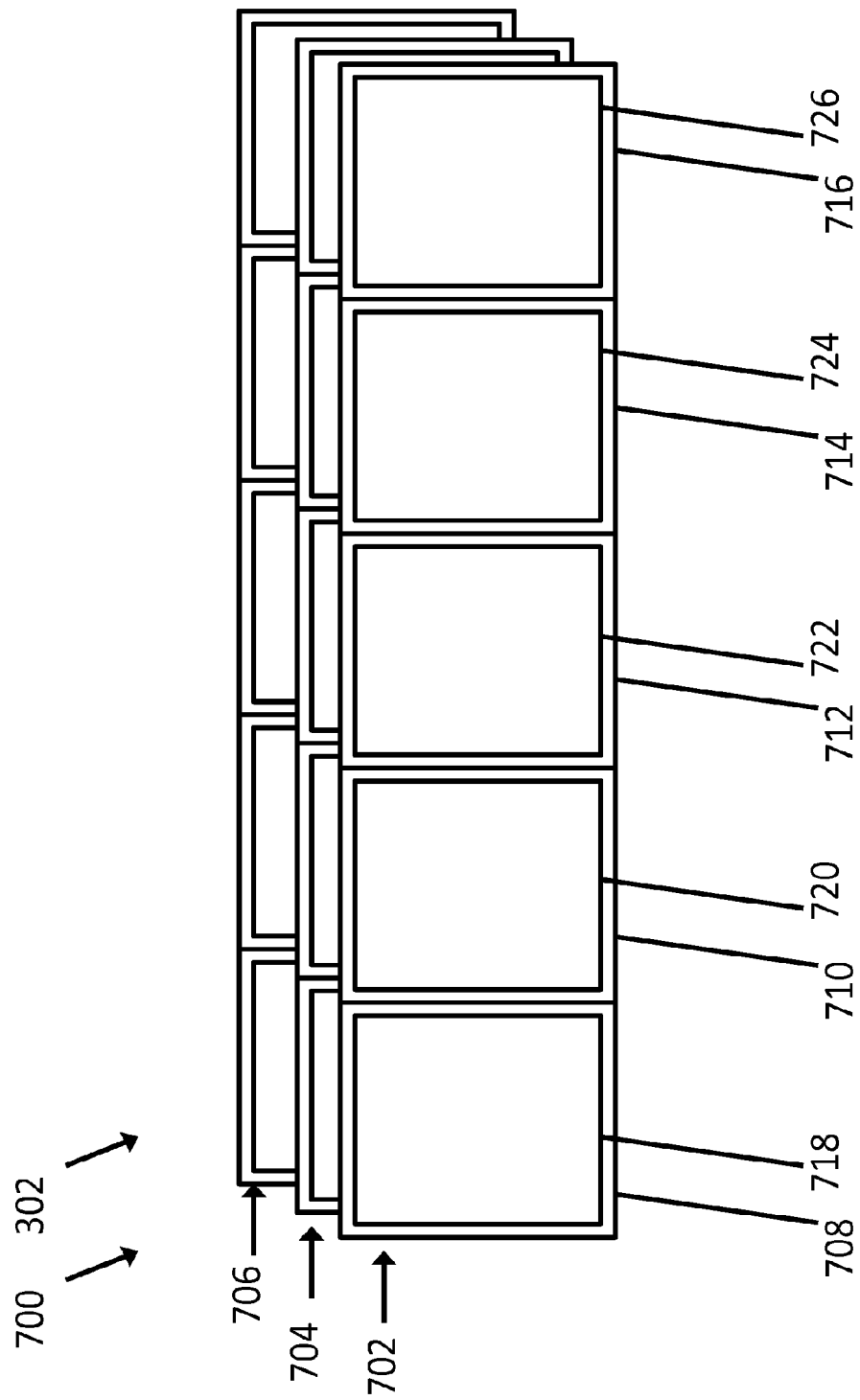
FIG. 7 is a diagram of another example content item.

FIG. 7 is a diagram of another example content item 700. Content item 700 is an implementation of content item 302, described above. Additionally, content item 700 is similar to content item 500, in that content item 700 includes slots 708, 710, 712, 714, and 716 and corresponding assets 718, 720, 722, 724, and 726. However, content item 700 additionally includes multiple sets 702, 704, and 706 of slots. While sets 702, 704, and 706 are shown in an overlapping arrangement, in other implementations, sets 702, 704, and 706 are arranged in any other configuration that presents each set 702, 704, and 706 in accordance with a priority or prominence level relative to the other sets 702, 704, and 706. Accordingly, when CMS 106 evaluates interaction indications and modifies instructions 402 (shown in FIG. 4), position information associated with content item 700 includes not only information about which slot a particular asset, for example asset 708, appeared in or will appear in, but also which set 702, 704, or 706 the asset, for example asset 708, appeared in or will appear in after CMS 106 modifies instructions 402.

Figure 8:
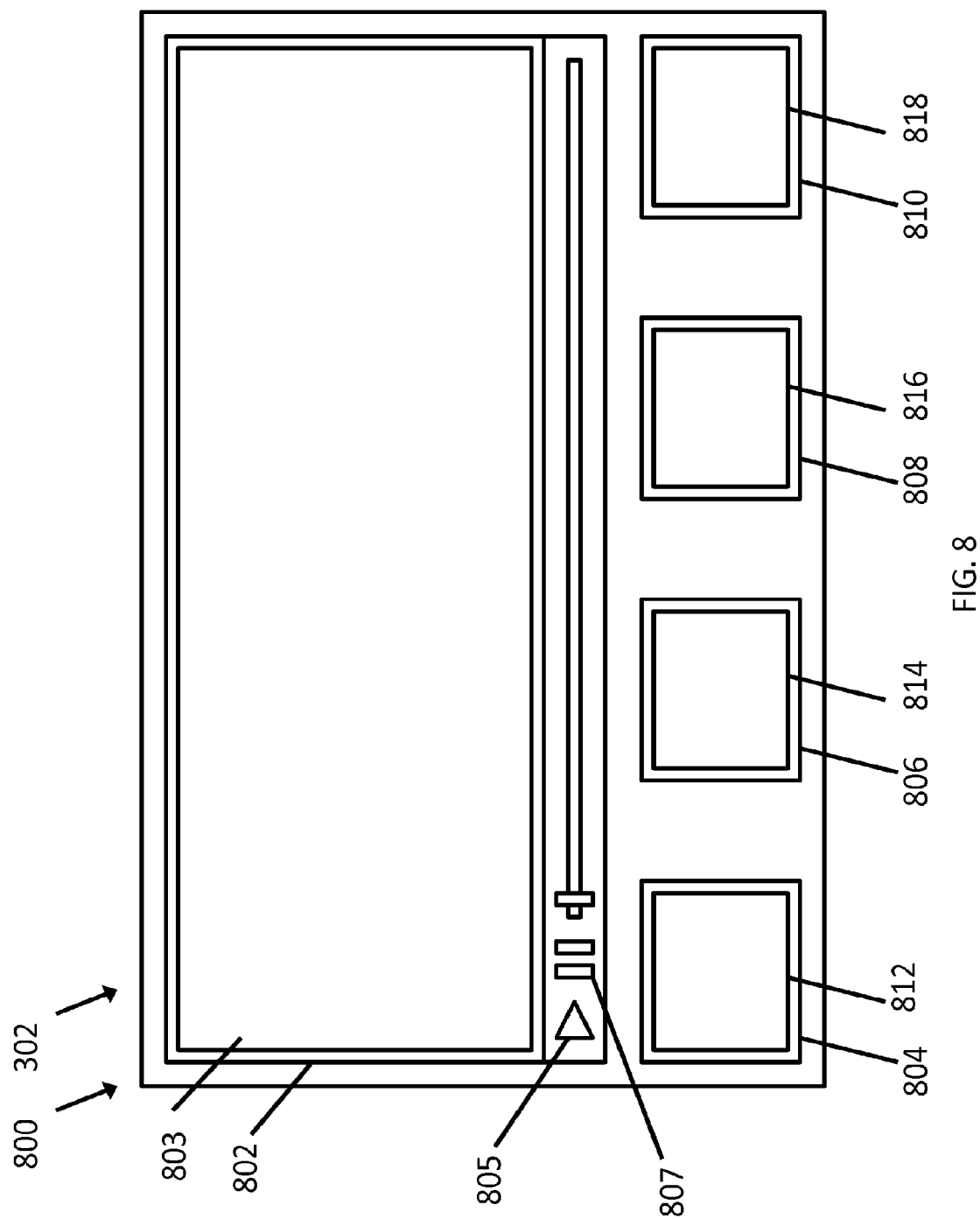
FIG. 8 is a diagram of another example content item.

FIG. 8 is a diagram of another example content item 800. Content item 800 is another implementation of content item 302, described above. Content item 800 includes a video pane 802 in which a video 803 may be played on client computing device 108. Video 803 is an asset 400 (shown in FIG. 4) of content item 800. Additionally, content item 800 includes first thumbnail slot 804, second thumbnail slot 806, third thumbnail slot 808, and fourth thumbnail slot 810. In each thumbnail slot is a corresponding thumbnail 812, 814, 816, and 818, which is an image or frame from video 803. Accordingly, each thumbnail 812, 814, 816, and 818 is an asset 400 of content item 800.

Play button 805 and stop button 807 may receive interactions to play and/or stop playback of video 803. Client computing device 108 transmits to CMS 106 indications of interactions, including when playback of video 803 began, when playback of video 803 stopped, and/or which frame of video 803 playback stopped on. CMS 106 may evaluate indications of interactions from client computing devices 108 that received and displayed content item 800 and may modify instructions 402 to load different frames from video 803 as thumbnails 812, 814, 816, and 818 in thumbnail slots 804, 806, 808, and 810. More specifically, CMS 106 may determine that a statistically significant drop-off in playback of video 803 occurs after a specific time, for example 25 seconds, into video 803. Accordingly, CMS 106 modifies instructions 402 to cause a client computing device 108 to display, in thumbnail slots 804, 806, 808, and 810, frames from video 803 that occur within the first 25 seconds of video 803. In other words, CMS 106 modifies instructions 402 to select a subset of assets (i.e., frames of video 803) of content item 800 for display with content item 800, as thumbnails 812, 814, 816, and 818. As a result, client computing devices 108 that receive content item 800 after CMS 106 has modified instructions 402 will load and display frames from the first 25 seconds of video 803 in thumbnail slots 804, 806, 808, and 810.

Figure 9:
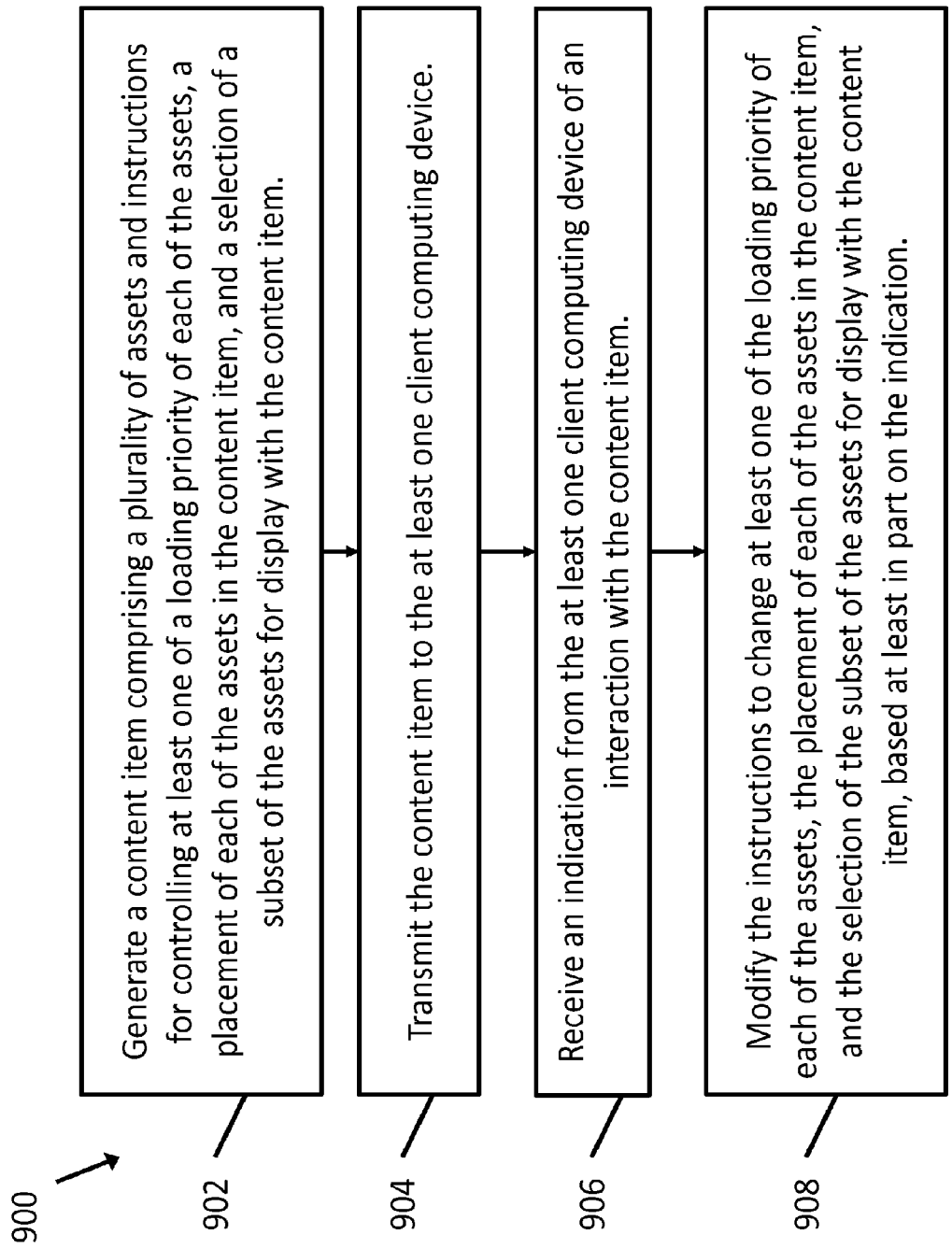
FIG. 9 is a flowchart of an example process for managing assets for a content item to be displayed on at least one client computing device.

FIG. 9 is a flowchart of an example process for managing assets for a content item to be displayed on at least one client computing device 108. Method 900 may be implemented by a server computing device, for example CMS 106. Initially, CMS 106 generates 902 a content item 302 comprising a plurality of assets 400 (shown in FIG. 4) and instructions 402 for controlling at least one of a loading priority of each of assets 400, a placement of each of assets 400 in content item 302, and a selection of a subset of assets 400 for display with content item 302. Next, CMS 106 transmits 904 content item 302 to at least one client computing device 108. Next, CMS 106 receives an indication from the at least one client computing device 108 of an interaction with content item 302. The interaction may be, for example, which asset 400 was clicked on first, which menu item 604, 606, 608, 610 (FIG. 6) was clicked on first, or when playback of a video 803 (FIG. 8) was stopped. Next, CMS 106 modifies instructions 402 to change at least one of the loading priority of each asset 400, the placement of each asset 400 in content item 302, and the selection of the subset of assets for display with content item 302, based at least in part on the indication. As described with reference to FIG. 4, the modification to instructions 402 may be made in furtherance of a particular goal, for example to increase a click-through rate for content item 302 or to increase an overall amount of time that content item 302 is displayed on a client computing device 108 and to increase an amount of assets 400 associated with content item 302 that are presented on client computing device 108 (e.g. to ensure that less popular assets 400 are also presented). Additionally, as described with reference to FIG. 4, in evaluating received indications of interactions and modifying instructions 402, CMS 106 may also take into account geographic locations of client computing devices 108, subject matter of publications 300 in which content item 302 appears, different form factors of client computing devices 108, other content items that are included in the same campaign as content item 302, and locations within content item 302 that each asset 400 appears in. CMS 106 may normalize the received indications of interactions based on one or more of the above-described factors.

Figure 10:
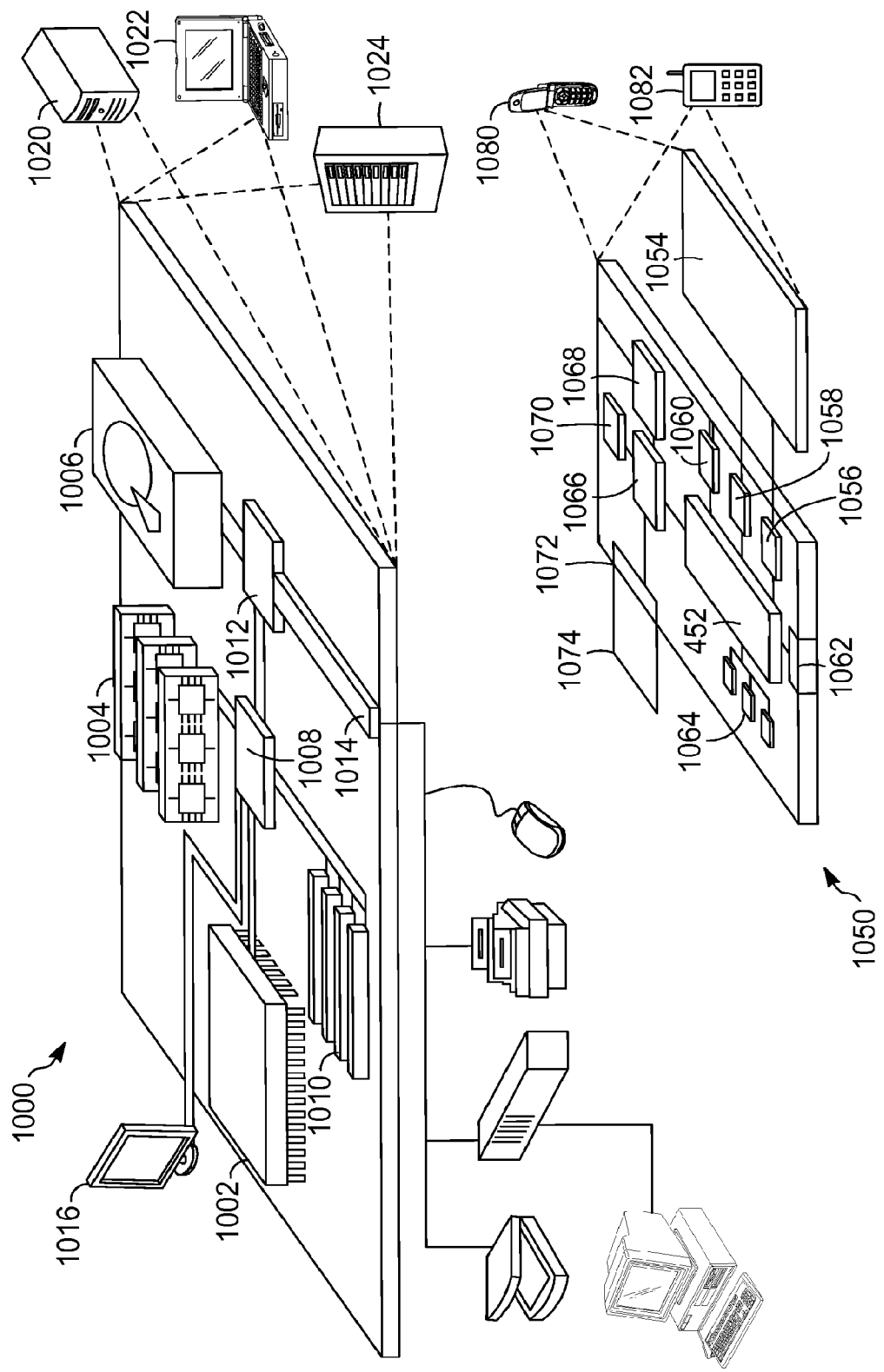
FIG. 10 is a diagram of example computing devices that may be used in the environment shown in FIG. 1.

FIG. 10 is a diagram of example computing devices 1000 and 1050 that may be used in the environment shown in FIG. 1. More specifically, FIG. 10 shows an example of a generic computing device 1000 and a generic mobile computing device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be examples only, and are not meant to limit implementations of the subject matter described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is for purposes of example only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. In other implementations, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provided as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052 that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning system) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, a computer tablet, or other similar mobile device.

Figure 11:
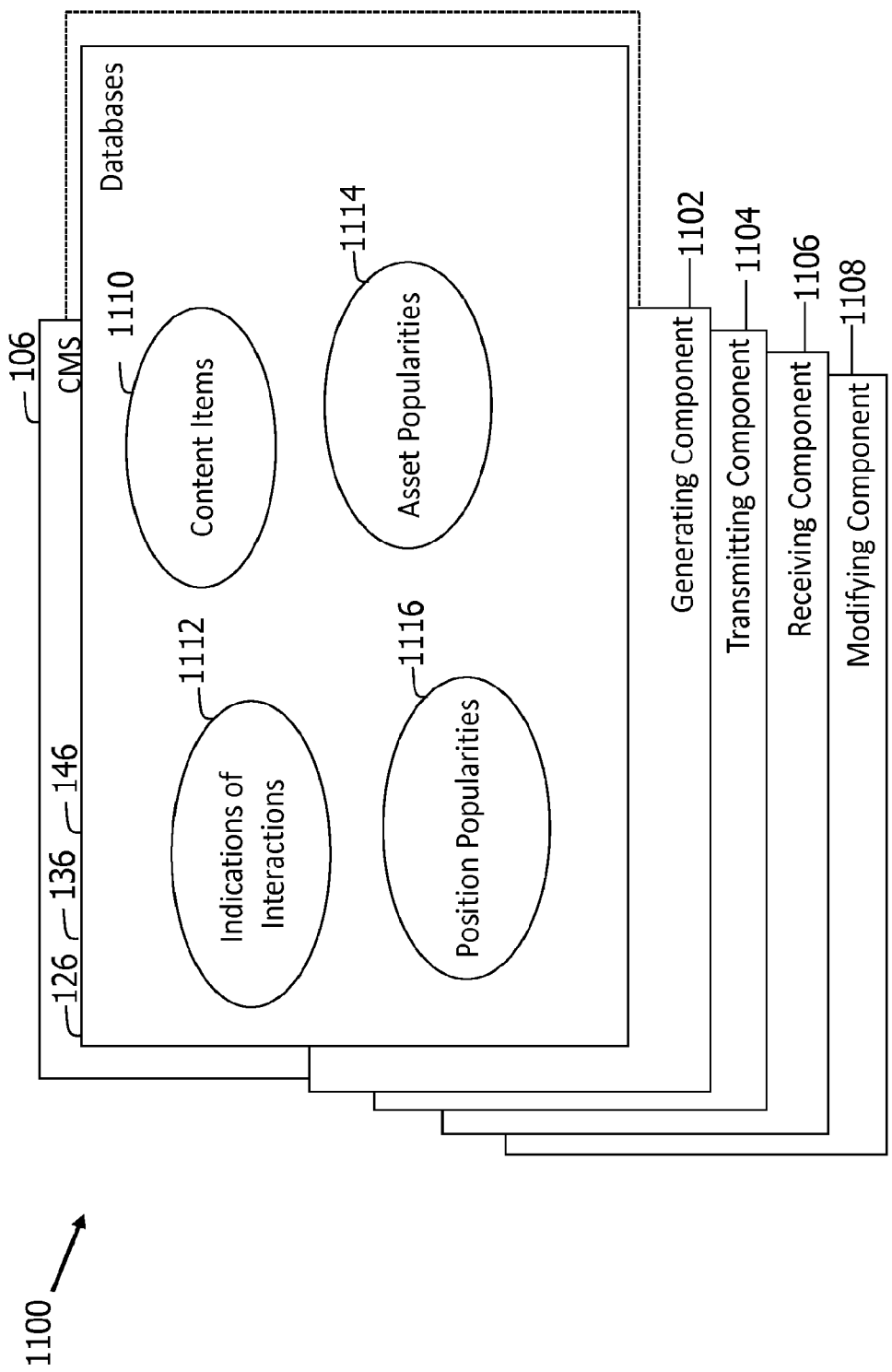
FIG. 11 is a diagram of components of one or more example computing devices that may be used in the environment shown in FIG. 1.

FIG. 11 is a diagram 1100 of components of one or more example computing devices, for example computing devices 1000 and/or 1050 (FIG. 10), that may be used in the environment shown in FIG. 1. For example, one or more of computing devices 1000 and/or 1050 may form content management system (CMS) 106. FIG. 11 further shows a configuration of databases 126, 136, and 146 (FIG. 1). Databases 126, 136, and 146 are coupled to several separate components within CMS 106, which perform specific tasks.

CMS 106 includes a generating component 1102 for generating a content item 302 comprising a plurality of assets 400 and instructions 402 for controlling at least one of a loading priority of each of the assets 400, a placement of each of the assets 400 in the content item 302, and a selection of a subset of the assets 400 for display with the content item 302. CMS 106 also includes a transmitting component 1104 for transmitting the content item 302 to at least one client computing device 108. CMS 106 additionally includes a receiving component 1106 for receiving an indication from the at least one client computing device 108 of an interaction with the content item 302. CMS 106 additionally includes a modifying component 1108 for modifying the instructions 402 to change at least one of the loading priority of each of the assets 400, the placement of each of the assets 400 in the content item 302, and the selection of the subset of the assets 400 for display with the content item 302, based at least in part on the indication.

In an exemplary embodiment, databases 126, 136, and 146 are divided into a plurality of sections, including but not limited to, a content items section 1110, indications of interactions section 1112, an asset popularities section 1114 containing information related to assets 400 and their popularities, irrespective of their locations or positions within content items 302, and a position popularities section 1116 containing information pertaining to positions or locations within content items 302 and their popularities, irrespective of the popularities of the assets 400. These sections within databases 126, 136, and 146 are interconnected to retrieve information pertaining to interactions with content items 302, and update instructions 402 of content items 302 as required.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In the example embodiment, computing systems 1000 and 1050 are configured to control loading of assets for a content item to be displayed on at least one client computing device and to modify the loading of the assets for updated versions of the content item based at least in part on past interactions with the content item. Computing systems 1000 and 1050 are further configured to manage and organize data associated with carrying out the above-described functions within at least one of memory 1004, storage device 1006, and memory 1064 using the techniques described herein.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or variations that may be included.

Also, the particular naming of the components, capitalization of terms, the attributes, data structures, or any other programming or structural aspect is not mandatory or significant, and the mechanisms that implement the subject matter described herein or its features may have different names, formats, or protocols. Further, the system may be implemented via a combination of hardware and software, as described, or entirely in hardware elements. Also, the particular division of functionality between the various system components described herein is merely for the purposes of example only, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A method of managing assets of content items to be displayed on client computing devices, comprising:
   transmitting, by a server, to a client computing device, a content item comprising a plurality of assets and instructions for controlling at least one of i) a loading priority of the plurality of assets, ii) a placement of each of the plurality of assets in the content item, or iii) a selection of a subset of the plurality assets for display with the content item;
   receiving, by the server, from the client computing device, an indication of an interaction by the client computing device with the content item; and
   modifying, by the server, the instructions to change at least one of i) the loading priority of the plurality of assets, ii) the placement of each of the plurality of assets in the content item, or iii) the selection of the subset of the plurality of assets for display with the content item, based on the indication of the interaction by the client computing device with the content item.

2. The method of claim 1, further comprising determining, by the server, an initial loading priority of the plurality of assets based on at least one of a predicted amount of click-throughs for the plurality of assets and an exposure time for the plurality of assets according to the instructions.

3. The method of claim 1, further comprising determining, by the server, at least one of the loading priority of the plurality of assets, the placement of each of the plurality of assets in the content item, and the selection of the subset of the plurality of assets for display with the content item based on a type of the indication of the interaction by the client computing device.

4. The method of claim 1, further comprising identifying a most popular asset of the plurality of assets and a least popular asset of the plurality of assets based on the indication of the interaction by the client computing device.

5. The method of claim 1, wherein modifying the instructions further comprises modifying the instructions to change at least one of the loading priority of the plurality of assets, the placement of each of the plurality of assets in the content item, and the selection of the subset of the plurality of assets for display with the content item based on a geographic location associated with the client computing device.

6. The method of claim 1, wherein modifying the instructions further comprises modifying the instructions to change at least one of the loading priority of the plurality of assets, the placement of each of the plurality of assets in the content item, and the selection of the subset of the plurality of assets for display with the content item based on a device type of the client computing device.

7. The method of claim 1, wherein modifying the instructions further comprises modifying the instructions to change at least one of the loading priority of the plurality of assets, the placement of each of the plurality of assets in the content item, and the selection of the subset of the plurality of assets for display with the content item based on campaign parameters associated with the content item.

8. The method of claim 1, wherein modifying the instructions further comprises modifying the instructions to change at least one of the loading priority of the plurality of assets, the placement of each of the plurality of assets in the content item, and the selection of the subset of the plurality of assets for display with the content item based on a subject category of an online publication on which the content item is displayed.

9. The method of claim 1, wherein transmitting the content item further comprises transmitting the content item comprising the instructions, the instructions causing the client computing device to load and display the plurality of assets according to the loading priority of the plurality of assets.

10. The method of claim 1, further comprising determining, by the server, a respective initial position for the plurality of assets within the content item based on at least one of a predicted amount of click-throughs at the respective initial position and an exposure time for at the respective initial position.

11. A system for managing assets for content items to be displayed on client computing devices, comprising:
a server that:
transmits to at a client computing device, a content item comprising a plurality of assets and instructions for controlling at least one of i) a loading priority of the plurality of assets, ii) a placement of each of plurality of assets in the content item, or iii) a selection of a subset of the plurality of assets for display with the content item;
receives from the client computing device, an indication of an interaction by the client computing device with the content item; and
modifies the instructions to change at least one of i) the loading priority of the plurality of assets, ii) the placement of each of the plurality of assets in the content item, or iii) the selection of the subset of the plurality of assets for display with the content item, based on the indication of the interaction from the client computing device with the content item.

12. The system of claim 11, wherein the server determines an initial loading priority of the plurality of assets based on at least one of a predicted amount of click-throughs for the plurality of assets and an exposure time for the plurality of assets according to the instructions.

13. The system of claim 11, wherein the server determines at least one of the loading priority of the plurality of assets, the placement of each of the plurality of assets in the content item, and the selection of the subset of the plurality of assets for display with the content item based on a type of the indication of the interaction by the client computing device.

14. The system of claim 11, wherein the server identifies a most popular asset of the plurality of assets and a least popular asset of the plurality of assets based on the indication of the interaction by the client computing device.

15. The system of claim 11, wherein the server modifies the instructions to change at least one of the loading priority of the plurality of assets, the placement of each of the plurality of assets in the content item, and the selection of the subset of the plurality of assets for display with the content item based on a geographic location associated with the client computing device.

16. The system of claim 11, wherein the server modifies the instructions to change at least one of the loading priority of the plurality of assets, the placement of each of the plurality of assets in the content item, and the selection of the subset of the plurality of assets for display with the content item based on a device type of the client computing device.

17. The system of claim 11, wherein the server modifies the instructions to change at least one of the loading priority of the plurality of assets, the placement of each of the plurality of assets in the content item, and the selection of the subset of the plurality of assets for display with the content item based on campaign parameters associated with the content item.

18. The system of claim 11, wherein the server modifies the instructions to change at least one of the loading priority of the plurality of assets, the placement of each of the plurality of assets in the content item, and the selection of the subset of the plurality of assets for display with the content item based on a subject category of an online publication on which the content item is displayed.

19. The system of claim 11, wherein the server transmits the content item comprising the instructions, the instructions causing the client computing device to load and display the plurality of assets according to the loading priority of the plurality of assets.

20. The system of claim 11, wherein the server determines a respective initial position for the plurality of assets within the content item based on at least one of a predicted amount of click-throughs at the respective initial position and an exposure time for at the respective initial position.

* * * * *